United States Patent [19]

Eden

[11] 4,360,924

[45] Nov. 23, 1982

[54] LASER BOTTLENECKING TECHNIQUE

[75] Inventor: J. Gary Eden, Urbana, Ill.

[73] Assignee: The United States of America as represented by the Secretary of the Navy, Washington, D.C.

[21] Appl. No.: 199,895

[22] Filed: Oct. 23, 1980

[51] Int. Cl.³ ............................................. H01S 3/00
[52] U.S. Cl. ...................................... 372/91; 372/55; 372/86; 372/69
[58] Field of Search ....................... 372/55, 19, 69, 91, 372/86

[56] References Cited

PUBLICATIONS

"Compact Coaxial Diode Electron Beam System: Carbon Cathodes and Anode Fabrication Techniques", by Eden et al., *Rev. Sci. Inst.*, 51 (6), Jun. 1980, p. 781.

Primary Examiner—William L. Sikes
Attorney, Agent, or Firm—Robert F. Beers; William T. Ellis

[57] ABSTRACT

A technique for lasing a gas in a gas lasing device to obtain stimulated light emission at a desired wavelength by bottlenecking the high gain transitions in the gas so that certain low gain transitions which will yield the desired wavelength are now able to oscillate. This technique comprises the steps of optimizing the mirror transmission for the desired light frequency, and pumping the laser gas with a pulse whose width is much longer than that required to bottleneck the high gain transitions. This technique may be utilized with both molecular and atomic gases.

18 Claims, 5 Drawing Figures

LASER BOTTLENECKING TECHNIQUE

BACKGROUND OF THE INVENTION

This invention relates generally to the field of gas lasers, and more particularly, to pumping techniques utilized to obtain a population inversion in gas lasers.

Gas lasers and their characteristics have been well known in the art for sometime, beginning with the helium/neon laser. In general, the population inversion required in order to obtain lasing in the gas is established in one of several ways two of which are: (1) By electron impact, i.e., directly transferring energy to gas atoms or molecules via electron collisions; (2) By means of a resonant energy transfer between a colliding donor atom and an acceptor atom or molecule to be lased.

The object of such energy pumping is to produce large densities of atoms in a particular excited energy state, which may subsequently radiate to one of a large number of lower energy levels. The optical transition of the atoms from the excited energy state down to any particular lower energy level is characterized by a transition probability or gain. Therefore, if a population inversion is obtained in the gas, then lasing will normally occur on the transitions having the largest probabilities. Indeed, this is the situation with most gas, liquid (dye) and solid state lasers. Unfortunately, this also limits the lasing wavelengths obtainable from a particular atom (or molecule). For a wide variety of atomic and molecular gas lasers, this restraint can be removed using the invention described here. This invention will allow these lasers to oscillate at more wavelengths, hence making them more versatile.

By way of example and not by way of limitation, these restraints on the wavelength attainable from a gas laser and the present technique for removing these restraints will be illustrated in terms of the argon/nitrogen laser. However, the use of the argon/nitrogen laser in the discussions to follow should not be construed in any manner as limiting the invention to that particular laser or even to molecular gas lasers.

Prior to discussing the lack of control of the spectral lines obtained with the $Ar/N_2$ laser, it may be helpful to review the general mechanics of the Ar to $N_2$ energy transfer used to obtain an $N_2$ population inversion. It is possible, of course, to directly populate the upper electronic energy levels in $N_2$ via the transfer of energy by collisions with high energy electrons. However, such a pumping technique is highly inefficient because it excites electrons in the $N_2$ molecules to a variety of vibrational levels in a variety of energy states depending on the amount of energy transferred in the individual collisions. Accordingly, a large number of the vibrational levels in the various electronic energy states will be populated at any given time, thereby preventing effective control of the spectral lines emitted during electron transitions down to lower energy states.

However, as is well known in the art, if the gas to be lased is mixed with a doner gas having a metastable energy state approximately coincident with the electron energy state selected for population in the lasing gas, then a highly efficient indirect energy transfer may be obtained between the gases to populate this selected energy level in the lasing gas. (A metastable energy state is defined as a state wherein the electrons have a relatively long mean lifetime before they fall to the ground state).

A high concentration of donor gas (by an order of magnitude or more) relative to the acceptor gas or gas to be lased is utilized to selectively populate via resonant energy transfer the coincident energy level of the gas to be lased. More specifically, when the donor/acceptor gas mixture is pumped, a large density of the donor gas in its metastable state is produced. As each excited donor atom or molecule collides with an acceptor atom or molecule, a transfer of all of the excited energy from the donor to the acceptor takes place via a resonant or excitation energy transfer. Because of the high concentration of donor gas in the gas mixture, a significant population of acceptor atoms or molecules is excited up to the energy level coincident with the donor metastable state. Such an indirect pumping technique is both controlled and highly efficient.

In the $Ar/N_2$ laser, this indirect pumping via the excitation of the argon gas is utilized to good effect. FIG. 1 is a partial energy level diagram of the argon atom juxtaposed with the partial energy level diagram for the nitrogen molecule $N_2$. Only the lower vibrational levels in selected electron energy states are shown for Ar and $N_2$ for ease of explanation. The $^3P_2$ and the $^3P_o$ energy states are metastable in argon while the $^3P_1$ and $^1P_o$ energy states are effectively metastable, i.e., the lifetimes of the electrons in those P states are long compared to the time required for excitation transfer of energy to $N_2$. It can be seen that these P metastable states of argon are approximately coincident with the several vibrational levels of the $C^3\pi_u$ electronically excited energy state of the nitrogen molecule $N_2$. By pumping the $Ar/N_2$ gas mixture with a relativistic electron beam or beams, a significant portion of the argon atoms will be excited to the metastable P states. These excited agon atoms will, in turn, collide and transfer their excitation energy to a significant portion of the $N_2$ population. Thus, a significant population of $N_2$ molecules will be excited to their $v'=0$ vibrational level of the C state, thus creating a population inversion between the C state and the lower lying B level.

A significant amount of experimentation with the $Ar/N_2$ laser has been reported since 1974 using this technique. A discussion of these laser experiments may be found in the following articles; Nelson, Mullaney, Byron, Applied Physics Letter 22, 79 (1973); Searles and Hart, Applied Physics Letter 25, 79 (1974); Basov, Vanilychev, Dolgikh, Kerimov, Dobanov and Suchkov, JETP Letters 20, 53 (1974); Ault, Bhaumik and Olson, IEEE, J. Quant. Electron, QE-10, 624 (1974). The standard pumping procedure in the experiments has been to excite a high pressure (greater than one atmosphere) $Ar/N_2$ gas mixture with electron beams of 100 ns or less in length. For example, Searles and Hart utilized a pulse at 500 keV with a length of 50 ns. Likewise, the $Ar/N_2$ laser described in U.S. Pat. No. 3,970,914 to Webster utilized a pulse at 1 MeV with a length of 20 ns. In these various lasing experiments with the $Ar/N_2$ laser, emissions were observed on the 0→1 transition of the C→B band energy level at 357.7 nm. In at least one experiment, the work by Searles and Hart, weak emission was also observed on the 0→2 transition at 380.5 nm. (See also Ernst, Tittel, Wilson and Marowsky, J. Applied Physics 50, 3879 (1979).) The apparent restriction of the $Ar/N_2$ laser to the 357.7 nm wavelength with some weak emissions at the 387.5 nm wavelength severely limits the versatility of this particular laser. Previous attempts to produce stimulated emissions from the 0→3 transition of the $N_2C→B$ band at the 405.9 nm wavelength using transverse excitation of the Ar/N$_2$ mixtures by an approximate 50 ns FWHM e-beam have been unsuccessful (see Eden, Chang, Palumbo, IEEE J. Quant. Electrons QE-15, 1146 (1979)), although one group of researchers did observe weak lasing on the 0→3 transition in a beam stabilized discharge. (See Nelson, Mullaney and Byron, Applied Physics Letters 22, 79 (1973).)

OBJECTIVES OF THE INVENTION

Accordingly, it is the object of the present invention to increase the versatility of a given laser gas mixture (and Ar/N$_2$, in particular) by allowing it to lase at a variety of selective wavelengths.

It is a further object of the present invention to control to a significantly greater extent than accomplished in the prior art the spectral line that lases in a particular gas lasing device.

It is yet another object of the present invention to generate a powerful laser in the violet spectral region.

Other objects, advantages and novel features of the invention will become apparent from the following detailed description of the invention when considered in conjunction with the accompanying drawings wherein:

SUMMARY OF THE INVENTION

Briefly, the above and other objects are obtained in a gas lasing device, by means of bottlenecking the higher gain transitions so that low gain transitions are able to oscillate thereby obtaining the desired frequency of stimulated light emission. This bottlenecking control of the transition is obtained by utilizing an energy pulse of longer duration than the usual energy pulse in the pumping phase of the laser operation. More specifically, this pumping pulse should be approximately one order of magnitude or greater in length than standard pumping pulses used in the prior art. With specific reference to the Ar/N$_2$ gas laser, a pumping pulse on the order of 500 ns or more in length should be utilized. Such a pulse will cause intense lasing on the 0→3 transition of the N$_2$ (C→B) band energy level at 405.9 nm wavelength, i.e. a violet line.

Additional control may be exerted over the lines which lase during the pumping phase of the lasing operation by applying a limited amount of energy to the lasing gas prior to the pumping step in order to either partially or fully bottleneck unwanted high probability laser transitions prior to pumping. After such a pre-pumping step, the initiation of pumping will cause the laser to reach the lasing threshold for the desirable probability transition almost immediately. In one embodiment, this pre-pumping energy application step may take the form of generating a weak electrical discharge in the gas chamber to cause the high probability vibrational transitions to become bottlenecked prior to the pumping step.

DETAILED DESCRIPTION OF THE INVENTION

As noted above, the present invention describes a new pumping technique for gas lasers which will allow low probability atomic or molecular transitions to lase by means of bottlenecking. Bottlenecking in the present context is defined as the rapid population and slow quenching (slow removal to the ground state) by collisions of certain atomic or molecular states. Such a rapid population of these lower energy levels will prevent the continued existence of a population inversion between the populated upper electronic energy state and these lower levels thus preventing the buildup of optical gain therebetween. Accordingly, lower gain optical transitions of this molecule are now able to lase.

As noted previously, the present invention will be described in the context of the Ar/N$_2$ laser, although the present pumping technique described herein is not limited to such a laser but may be utilized in a wide variety of atomic and molecular gas lasers. Moreover, it should be understood that Applicant does not intend to limit himself to a particular theory or theories relating to atomic and molecular energy state transitions.

Figure 1:
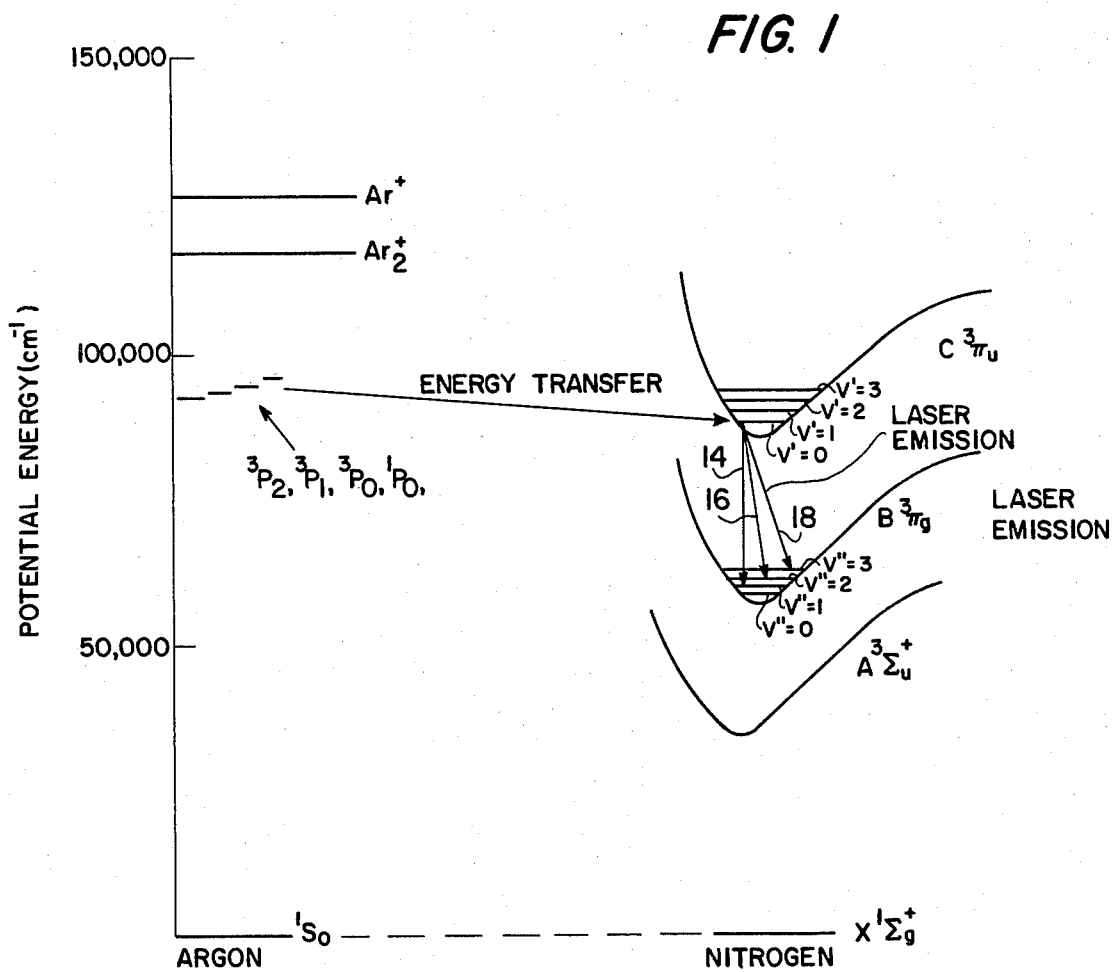
FIG. 1 is a partial energy level diagram of the argon (Ar) atom and the nitrogen (N$_2$) molecule.

Referring again to FIG. 1, when a laser gas cavity or chamber containing a high concentration of argon relative to that of nitrogen is pumped with energy, the metastable and effectively metastable P energy states of the argon atom becomes significantly populated, as is well known in the art. Since these argon metastable P energy states are approximately coincident with the v'=0 vibrational level of the $C^3\pi_u$ electronically excited energy state of the nitrogen molecule, there will be a significant excitation transfer 12 which will allow transfer of this excited energy from the high density excited argon atoms to the nitrogen molecules, thereby creating a significant population inversion in v'=0 in the C energy state over that of the various vibrational levels of the B energy state.

The transition probabilities from the v'=0 in the C energy state down to the vibrational levels in the B energy state decrease monotonically for the optical transitions 0→0, 0→1, 0→2, etc. The 0→0 transition is quenched almost immediately. The 0→1 transition 14 yields the 357.7 nm wavelength emission, while the 0→2 transition 16 yields the 380.5 nm wavelength emission. The present technique may be utilized to bottleneck these high probability transitions 14 and 16 to thereby allow the transition 18 from v'=0 in the C energy state to v"=3 in the B energy state (406 nm wavelength) to lase. In fact, a transition to higher vibrational levels would be possible merely by bottlenecking all of the preceding v" vibrational levels in that energy state. Such a technique thus significantly increases the spectral versatility of a given gas mixture in a gas laser.

Figure 2:
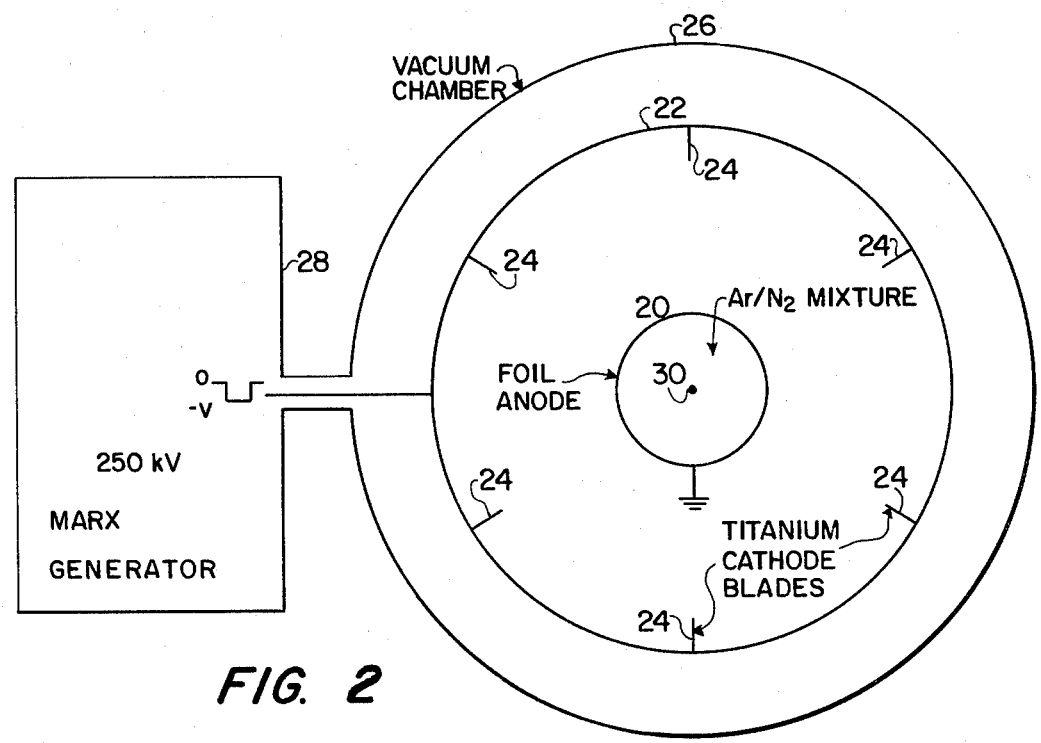
FIG. 2 is a partial schematic diagram of the e-beam generator which may be utilized to pump a laser gas.

Referring now to FIG. 2, there is shown a partial schematic diagram of a pumping apparatus which may be utilized to effect the present inventive technique. This figure shows a coaxial e-beam generator. However, it should be noted that it is not intended to limit the present pumping technique to e-beam generators. Referring more specifically to the figure, an Ar/N$_2$ gas mixture is held in a gas chamber or cavity 20. An electron diode is set up between a cathode 22 and the outer shell of the gas chamber 20 (the anode). It was determined by Ault, Applied Physics Letter 26, (1975), that coaxial e-beam pumping of the Ar/N$_2$ laser is preferred over transverse e-beam excitation because electron scattering in the anode foil and the active medium is reduced with such a cylindrical excitation. Moreover, the azimuthal symmetry of the coaxial pump is conducive to producing an output laser beam of high spatial quality. Accordingly, the cathode 22 is disposed coaxially around the gas chamber 20. The cathode 22 is comprised of six titanium foil blades 24 which may be on the order of 25 um in thickness with an approximate six mm width and a 50 cm length equally spaced on the interior of the cylindrical cathode 22. The cylinder for the cathode 22 may be made of aluminum and may have an approximate inner diameter of 8.9 centimeters with a 55 centimeter length. The anode/gas chamber 20 may have a diameter of 2.5 centimeters and may be fabricated by welding 25 um thick Ti foil into a tubular form. An anode made of foil with this thickness allows electrons with energies on the order of 100 keV or greater to penetrate the anode, thereby exciting the Ar/N$_2$ laser mixture. To maintain the vacuum integrity of the laser cell, a vacuum chamber 26 is disposed around the cathode 22. The voltage potential for the anode may be conveniently set at ground by means of stainless steel tubing welded to the anode foil and then sealed to the vacuum chamber with O-rings and Be-Cu fingerstock. The anode-cathode spacing for such a diode is approximately 2.5 cm. Power for the diode may be provided by a voltage generator 28 capable of generating high voltage pulses such as, for example, a five stage Marx generator with an equivalent series inductance of approximately 0.4 uH. Details of the construction and the performance of the Marx generator and this cylindrical diode may be found in the reference Eden and Epp, Review of Scientific Instruments, Vol. 51, p. 781, June 1980. The diode described herein has an excitation length of 50 cm and an active volume of approximately 250 cm$^3$ and produces a current pulse of approximately 0.5 us FWHM.

The laser apparatus constructed with this e-beam diode comprises a stable optical cavity composed of 2, 3 or 5 meter radius of curvature dielectric mirrors separated by approximately 1 meter. One of the mirrors is highly reflecting (R>99.9%) at 406 nm (the desired wavelength) while the other mirror constituting the output coupler may transmit approximately 0.1, 9 or 33% at that wavelength.

It has been found that by pumping with an e-beam pulse on the order of 500 ns in length, the 0→1 and 0→2 transitions 14 and 16 (FIG. 1) in the C→B energy band become bottlenecked in their ground states, thereby allowing the transition 18 from the v'=0 level of the C energy state to the v"=3 level of the B energy state (0→3), i.e., a violet transition. Such bottlenecking was a quite unexpected phenomena since it was presumed that atoms in the v"=3 level would quickly fall to the v"=0 state via collisional quenching.

Figure 3:
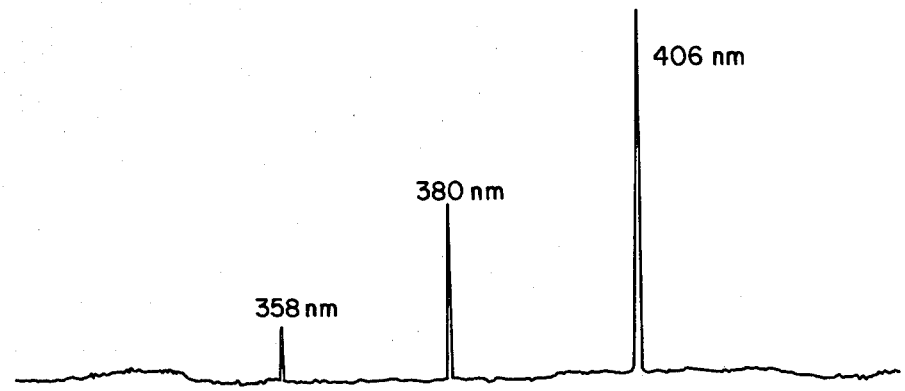
FIG. 3 is a graph of the laser emission spectra for 2000 Torr Ar, 100 Torr N$_2$ gas mixtures radiated by an e-beam.

The laser spectrum obtained when a pulse of this length is utilized for pumping is shown in FIG. 3. This spectrum was recorded by viewing the axial emission through an output coupling mirror which transmitted 8% at 406 nm and 1% at 358 and 380 nm. It can be seen that there is strong lasing at the violet wavelength 406 nm.

Figure 4:
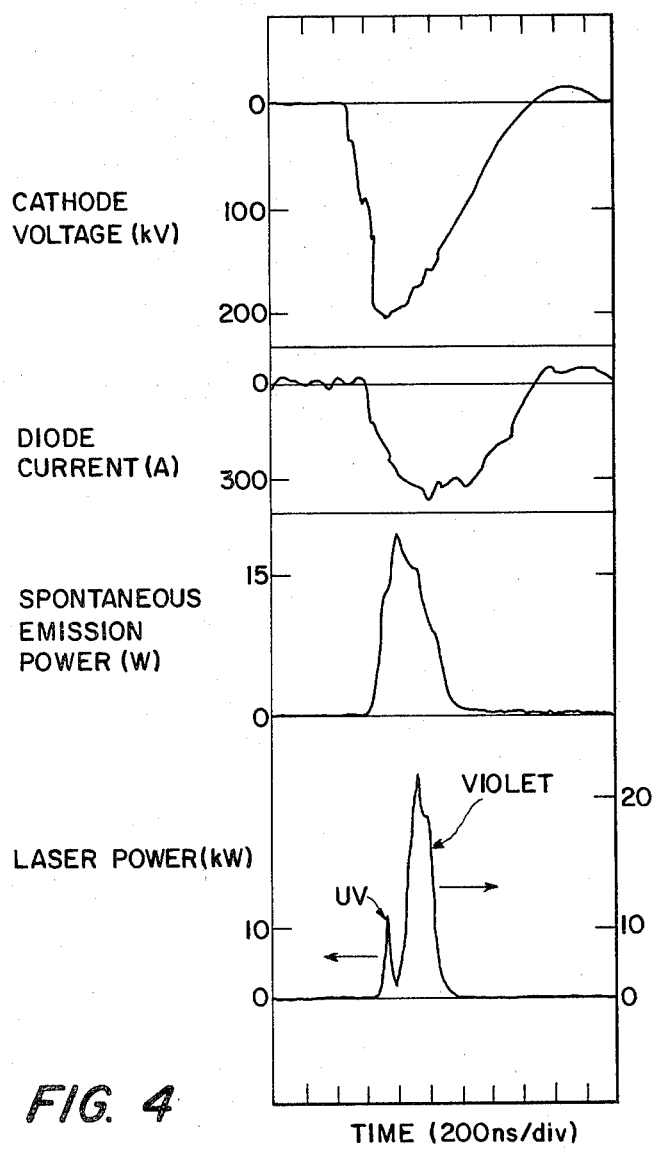
FIG. 4 is a vertical transposition of the cathode voltage, diode current, spontaneous emission power, and laser power disposed graphically to show the relative timing of these various waveforms.

Referring now to FIG. 4, the relative timing of the various waveforms generated in this laser are superimposed vertically for purposes of comparison. The top graph represents the cathode voltage in kilovolts. Since approximately 100 keV of electron energy is required to penetrate the anode foil and excite the gas mixture, then the usable width of the voltage pulse is approximately 0.5 us. A graph of the diode current in amperes is disposed directly below the cathode voltage graph of FIG. 4. Below the graph of the diode current is a graph of the spontaneous emission power in watts. It should be noted that the spontaneous emission (recorded without the use of bandpass filters) persists until the cathode voltage falls below approximately 100 kV. A graph of the laser power in kilowatts is disposed below the spontaneous emission power graph. It can be seen that within approximately 100 ns of the onset of the excitation current, stimulated emission on the 0→1 and 0→2 ultraviolet lines begins. It should be noted that the proper scale for this UV pulse is on the left side of the graph. Moreover, it should be noted that the UV laser pulse shown in FIG. 4 is intended only to indicate the relative timing of the violet and the UV laser emission. Much more intense UV pulses, up to 43 kilowatt peak power, were frequently observed. It can be seen from a review of this laser power graph that the v"=1 and v"=2 levels of the B state are rapidly populated and slowly quenched or removed to the ground state, i.e., bottlenecked. Thus, lasing on the ultraviolet lines is terminated in approximately 50 ns. Following this termination, the lower gain 0→3 transition 18 oscillates, yielding a laser pulse of approximately 200 ns (FWHM). The proper scale for this pulse is on the right border of the graph. The decay of this violet laser pulse roughly follows the fall of the diode voltage and the total fluorescence. Such a decay characteristic suggests that for the conditions of this particular diode, bottlenecking of the 0→3 violet transition will not occur for a significant period of time. The explanation for this occurrence may be that the N$_2$ v"=3 level of the B energy state is closely coupled to the lower vibrational levels by collisions with the background argon gas. In any event, the energy extractable on the 0→3 transition appears to be quite significant (more than 2 mJ at the present time).

Figure 5:
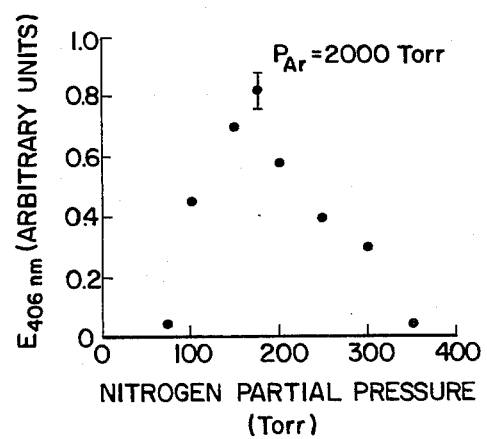
FIG. 5 is a graph of the nitrogen partial pressure in Torr versus laser output.

FIG. 5 illustrates the variation of the 406 nm laser energy output with partial pressure of nitrogen for 2,000 Torr Ar/N$_2$ mixtures. It can be seen that the maximum output is obtained for 180 Torr N$_2$. This behavior is consistent with the behavior of the ultraviolet laser lines obtained by prior researchers using short pulse e-beams.

Table 1 shows the output energies obtained on the UV and the violet transitions for various output mirror couplings. The maximum violet laser energy realized, 1.8±0.3 mJ, was obtained with a cavity output coupling of 8%. The best single shot energy obtained was 2.2 mJ. This is to be compared with the optimum energy output for the UV lines of 2.2±0.4 mJ which was obtained for a mirror coupling T=43% at 358 nm. It should be noted that the violet energy output is comparable to the maximum UV energy obtained although the gain on the violet line is only 11% of that for the 358 nm line. Moreover, due to the long bottlenecking time for the 0→3 transition, the violet energy extractable from this lasing transition appears capable of significant extension merely by increasing the e-beam current pulse width. Such an extension should significantly improve the efficiency of the laser.

VARIATION OF VIOLET AND UV LASER ENERGY
WITH OUTPUT COUPLING

| λ (nm) | T (%) | $E_{out}$(mJ) |
|---|---|---|
| 406 | 0.1 | ~0.1 |
| 406 | 8 | 1.8 ± 0.3 |
| 406 | 33 | 1.5 ± 0.4 |
| 358,380 | 43 (358 nm)<br>0.2 (380 nm) | 2.2 ± 0.4 |

The foregoing discussion demonstrates a new visible laser based on the use of a "bottlenecking" technique of known laser transitions. The Ar/N$_2$ violet laser is the first such powerful laser in this spectral region. Dye lasers, metal vapor lasers and other gas lasers either lase weakly or not at all in the violet spectrum. It should be noted that this laser may be useful in the photochemical separation of plutonium from uranium as described in the reference Eden, Burnham, Champagne, Donohue and Djer, "Visible and UV Lasers; Problems and Promises" IEEE Spectrum, April 1979, pages 50–59. Such a photochemical separation scheme requires a violet laser with an average power of 170 watts: a power level possibly obtainable here by flowing the Ar/N$_2$ gas through a larger laser cell.

It should be noted that further extension of the pump pulse with the present Ar/N$_2$ laser may result in the lasing on the blue 0→4 transition (434 nm) of the C-B energy band. Such a wavelength would be quite valuable in the bathymetry, ASW and communications fields.

It may be desirable to minimize the lasing threshold during the pumping stage or to minimize or eliminate lasing on the higher probability transitions in the B energy state. To this end a limited amount of energy may be applied to the lasing gas chamber prior to the main pumping pulse in order to minimize the time needed to reach lasing threshold and/or to bottleneck the higher probability or gain transitions in the B→C band prior to the pumping step. Such an energy application could be accomplished by generating a weak electrical discharge in the gas chamber such that a significant density of molecules in the v"=0, 1 and 2 levels of the B state is established prior to the arrival of the main pump pulse and therefore the 0→0, 1 and 2 transitions are bottlenecked. With respect to the Ar/N$_2$ laser under discussion, this would allow the violet transition to lase immediately following the application of the e-beam current pulse, thereby improving the laser's efficiency.

This weak electronic discharge may be accomplished by inserting an axial wire or anode 30 concentrically within the grounded foil anode 20. When a positive voltage pulse is applied to this axial wire anode 30 a weak d.c. discharge will be obtained. Such a discharge will populate the v"=0,1,2 levels of the B energy state of N$_2$ prior to the arrival of the pump pulse. Therefore, lasing on the UV transition lines would either not occur or would terminate very rapidly allowing energy to be more efficiently extracted in the violet transition. The proper size voltage pulse to be applied to the anode 30 will, of course, depend on the pressure of the gas in the cavity 20. However, it will probably be on the order of 2 kV.

This same effect could also be produced by creating a microwave or RF discharge inside the tubular foil. Such a discharge could be obtained by loosely wrapping coils around the tubular foil 20 (not shown in FIG. 5).

In essence, the above discussed pre-pumping discharges cause a plasma breakdown in the gas with a consequent arc-over to the foil 20. Such an arc-over will populate the N$_2$ B state v"=0,1 and 2 levels via direct electron impact excitation (collisions of electrons with N$_2$).

Finally, this effect might be produced by insulating the anode 30 with glass tubing in order to create a corona discharge around the tubing.

In summary, the present invention discloses a new pumping technique to allow low probability laser transitions by bottlenecking of higher probability or high gain laser transitions. This transition bottlenecking is obtained by means of a long pumping pulse approximately an order of magnitude greater than the pumping pulses taught by the prior art.

Generally, the energy of the prior art pulse will depend on the pumping mechanism chosen. With e-beam pumping, the pulse voltage should be 100 kV or greater and typically on the order of 300–500 kV. If electric discharge excitation is utilized, then the E-field-number density ratios E/N generally range from $10^{-17}$ to $10^{-16}$ volt-cm$^2$. However, regardless of the pumping technique chosen, the pumping step should utilize an energy pulse of sufficient power density to cause lasing of the high gain transitions during the initial portion of the pulse and with a width extending significantly beyond this initial high gain transition lasing point, i.e. the pulse is significantly longer than the standard pulse utilized to lase the high gain transition of a given laser.

With specific respect to the Ar/N$_2$ laser, prior art pumping pulses are generally on the order of 30 to 50 ns. These figures are compared to our relatively long pumping pulse of approximately 500 ns. The use of such a pumping technique with the Ar/N$_2$ laser yields a powerful violet laser with a peak power of approximately 25 kilowatts and provides the option of obtaining even longer wavelengths.

Some examples of other molecular lasing gases which could be utilized to produce additional laser lines by artificially inducing bottlenecking of high probability laser transitions are N$_2$+, O$_2$+, XeF. Additionally, the present technique could be utilized on the (B A) band which would yield various infrared wavelengths.

As noted earlier, the foregoing technique is applicable not only to other molecular laser gas transitions but also to atomic gas transitions where one upper state and a variety of lower states are involved. For this technique to work, the lower states must be coupled to each other by collision and yet most of these lower states must be slowly quenched. This last requirement insures that these high gain transitions remain bottlenecked while lasing proceeds on the lower gain transitions.

In sum, the present pumping technique significantly expands the spectral versatility of a given laser gas. It should find broad utility throughout the lasing art.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A technique for causing a gas lasing device including an optical cavity having a plurality of reflecting surfaces to strongly lase a gas in a gas chamber from a desired vibrational level in an upper populated electronic energy state, to a lower electronic energy state via a low probability optical transition in order to obtain a desired frequency of stimulated light emission comprising the steps of:

choosing the reflecting surface at one end of said lasing device to have a maximum transmission characteristic for the desired light frequency;

introducing a lasing gas having an upper electronic energy state with a desired vibrational level and a lower electronic energy state with a plurality of levels therein such that there are a plurality of potential lasing transitions between said desired vibrational level of said upper energy state and said lower energy state, with some of these transitions being high gain transitions and with some of these transitions being lower gain transitions, there being a specific energy required to bottleneck these high gain transitions;

pumping said lasing gas with an energy pulse of sufficient power density to cause lasing of the high gain transitions during the initial portion thereof with the width of the energy pulse extending significantly beyond this initial high gain transition lasing point in order to bottleneck these high gain transitions and thereby allow the lower gain transitions to oscillate.

2. A technique for lasing as defined in claim 1, wherein said pumping step comprises pumping with a pulse length approximately an order of magnitude greater than 50 ns.

3. A technique for lasing as defined in claim 2, wherein said pumping step comprises pumping with a low current pulse on the order of 1-5 amperes/cm$^2$.

4. A technique for lasing as defined in claim 1, wherein said pumping step comprises pumping with a pulse of approximately 500 ns or more in length.

5. A technique for lasing as defined in claims 1 or 4, including the additional step of applying a limited amount of energy to said lasing gas prior to said pumping step in order to minimize the energy needed to bottleneck the undesired transitions during said pumping step.

6. A technique for lasing as defined in claim 5, wherein said limited energy applying step comprises the step of generating a weak electronic discharge within said gas chamber.

7. A technique for lasing as defined in claims 2 or 4, wherein said gas chamber includes a high concentration, relative to said lasing gas, of a donor gas having an excited effectively metastable electronic energy state approximately coincident with said desired vibrational level of said upper electronic energy state of said lasing gas, and wherein said pumping step comprises the step of exciting a significant population of said donor gas to this coincident effectively metastable state in order to excite via excitation transfer a significant population of said lasing gas to the desired vibrational level in its higher electronic energy state.

8. A technique for lasing as defined in claim 7, wherein said pumping step includes the step of pumping the donor gas argon in order to selectively excite the lasing gas $N_2$.

9. A technique for lasing a gas having an upper electronic energy state and a lower electronic energy state, said lower state having a plurality of levels therein such that there are a plurality of potential lasing transitions between said upper energy state and said levels of said lower energy state with some of these transitions being high gain transitions and some being lower gain transitions and with at least one of these lower gain transitions being a desired low gain transition, said gas being contained in a gas chamber of a gas lasing device to obtain a stimulated light emission at a desired wavelength by causing said desired low gain or low probability transition to lase in the gas comprising the step of bottlenecking the higher gain transitions in the gas such that this desired low gain transition is now able to lase.

10. A technique for lasing as defined in claim 9, wherein said bottlenecking step comprises the step of pumping said lasing device with an energy pulse of approximately an order of magnitude or more longer duration than the usual pumping pulse of approximately 50 ns duration.

11. A technique for lasing as defined in claim 9, wherein said bottlenecking step comprises the step of pumping said lasing device with an energy pulse of sufficient power density to cause lasing of the high gain transitions during the initial portion thereof and with a width of the energy pulse extending significantly beyond this initial portion of the energy pulse.

12. A technique for lasing as defined in claim 11, wherein said energy pulse in said pumping step is pumped for approximately 500 ns or more.

13. A technique for lasing as defined in claim 11, including the additional step of applying a limited amount of energy to said lasing gas prior to said pumping step in order to at least partially bottleneck the high gain transitions in said lasing gas thereby minimizing the pumping energy needed for bottlenecking in said pumping step.

14. A technique for lasing as defined in claim 13, wherein said limited energy applying step comprises the step of generating a weak electronic discharge within said gas chamber.

15. A technique for lasing as defined in claims 10 or 12, wherein said gas chamber includes a mixture of Ar and $N_2$.

16. A gas laser for obtaining stimulated light emission at a desired wavelength by causing low probability optical transitions within a laser gas to oscillate comprising:

a gas to be lased having an upper electronic energy state and a lower electronic energy state, said lower state having a plurality of levels therein such that there are a plurality of potential lasing transitions between said upper energy state and said levels of said lower energy state with some of these transitions being high gain transitions and some being lower gain transitions and with at least one lower gain transition being a desired low gain transition, with a specific energy required in order to bottleneck the laser transitions with higher gains than said desired low gain transition;

a resonant cavity including a particle reflecting surface for abstracting lasing emissions;

a gas chamber disposed in said resonant cavity for containing said gas to be lased and adapted to be pumped with energy;

means adapted for generating a weak energy discharge within said gas chamber in order to reduce the energy required to bottleneck high gain laser transitions in the gas; and pumping means for pumping said lasing gas after said weak energy discharge with a pulse of sufficient length to complete the bottlenecking of the high gain laser transitions and to initiate the desired low gain transition.

17. A gas laser as defined in claim 16, wherein said gas chamber comprises a tubular anode with the gas contained therein; and said pumping means comprises a cathode coaxial with an surrounding said tubular anode and adapted for being charged by high voltage pulses from a voltage generator.

18. A gas laser as defined in claim 17, wherein said weak discharge creating means comprises an electrode disposed coaxially within said tubular anode and adapted to be charged to a higher voltage potential than said tubular anode for effecting a weak discharge therebetween.

* * * * *